United States Patent [19]

Lin et al.

[11] Patent Number: 5,009,791

[45] Date of Patent: Apr. 23, 1991

[54] MAGNETIC TREATMENT OF WATER USED FOR AGRICULTURAL PURPOSES

[76] Inventors: Israel J. Lin, Post Hof Hacarmel, Kerem Maharal, Israel, 30840; Jacob Yotvat, 31 Harishonim Street, Kiriat Haim, Israel, 26302

[21] Appl. No.: 395,897

[22] Filed: Aug. 18, 1989

[30] Foreign Application Priority Data

Jul. 17, 1989 [IL] Israel .................................. 091014

[51] Int. Cl.$^5$ ...................... C02F 1/48; B01D 35/02; A01K 7/02
[52] U.S. Cl. .................................... 210/695; 119/73; 119/74; 210/223; 210/774; 210/805
[58] Field of Search .............. 210/222, 223, 695, 747, 210/805, 774; 119/72, 73, 74

[56] References Cited

U.S. PATENT DOCUMENTS

| | | | |
|---|---|---|---|
| 2,724,365 | 11/1955 | Snider | 119/74 |
| 3,379,637 | 4/1968 | O'Brien | 210/222 |
| 3,951,807 | 4/1976 | Sanderson | 210/222 |
| 4,146,479 | 3/1979 | Brown | 210/222 |
| 4,153,559 | 5/1979 | Sanderson | 210/222 |
| 4,216,092 | 8/1980 | Shalhoob et al. | 210/222 |
| 4,248,177 | 2/1981 | Peterson et al. | 119/73 |
| 4,265,755 | 5/1981 | Zimmerman | 210/222 |
| 4,299,700 | 11/1981 | Sanderson | 210/222 |
| 4,422,933 | 12/1983 | Sverne et al. | 210/222 |
| 4,734,202 | 3/1988 | Mach | 210/222 |
| 4,757,784 | 7/1988 | Hammer | 119/72 |

FOREIGN PATENT DOCUMENTS

| | | | |
|---|---|---|---|
| 0322544 | 7/1989 | European Pat. Off. | 210/695 |
| 2814286 | 10/1979 | Fed. Rep. of Germany | 210/222 |
| 213909 | 3/1983 | Fed. Rep. of Germany. | |
| 3333551 | 3/1984 | Fed. Rep. of Germany. | |
| 3433417 | 3/1986 | Fed. Rep. of Germany | 210/695 |
| 3620320 | 12/1987 | Fed. Rep. of Germany | 210/222 |
| 60-212284 | 10/1985 | Japan | 210/695 |
| 807364 | 11/1980 | South Africa. | |
| 1217788 | 3/1986 | U.S.S.R. | 210/222 |
| 2132997 | 7/1984 | United Kingdom | 210/695 |

OTHER PUBLICATIONS

Application of Magnetized Waters in Rabbit Breeding; A. P. Maximov and L. V. Burova; Russian article: pp. 78–80.

Use of Magnetized Water for Washing; N. F. Bondarenko et al; Russian article; pp. 73–77.

Primary Examiner—W. Gary Jones
Attorney, Agent, or Firm—Frishauf, Holtz, Goodman & Woodward

[57] ABSTRACT

A method of magnetically treating drinking water for domestic livestock comprises the steps of: mechanically filtering the water to effect removal of ferromagnetic particles; causing the water to pass through a magnetic field of alternating polarity of an intensity between 600 and 6500 gauses and of a field gradient of between 0.2 and 6.0 kgauss/cm, whereby the flow is laminar at a velocity of between 0.5 and 2.4 m/s.; recirculating water not consumed by the animals by pumping it again through the magnetic field, while choosing the distance between the points of alternating polarity and the water velocity in such a manner that each water particle experiences not less than 2 and not more than 60 polarity changes per second.

4 Claims, 5 Drawing Sheets

MAGNETIC TREATMENT OF WATER USED FOR AGRICULTURAL PURPOSES

BACKGROUND OF THE INVENTION

The present invention relates to a method and to a device for the magnetic treatment of water used in agriculture, particularly for irrigation of plants and for watering of domestic animals.

Magnetic treatment of water and other liquids has been known for a number of years, the purpose of the treatment being preventing build-up of scale in the pipes and vessels through which the water flows. The devices used for this treatment comprise essentially a multi-pole magnet positioned in an inner casing of a non-magnetic material, concentrically mounted in an outer tubular casing of a magnetic material, water flowing along the annular duct formed between the inner and the outer casing. The magnet creates a strong magnetic field which has an outer limit defined by the outer casing of magnetic material. The treatment deforms the molecules of the suspended minerals in a way preventing their adhering to the walls of the pipes and vessels along which they flow and thus preventing formation of scale. The molecules return to their original alignment after a few hours, and it is known that for recirculating water or other liquids the treatment is advantageously repeated for every circuit.

Multi-pole magnets for this purpose were originally manufactured by Kentune Inc. Fort Wayne, U.S.A., and they are still the most suitable for this kind of treatment. The original patent having expired, various modifications and additions to the original design have been patented, by the above firm and by others, with the object of either better securing the magnet or for treating only a given part of the water, as in the case of vehicle cooling by recirculation through a radiator, or with other purposes in mind.

A few years ago we learned of experiments regarding magnetic treatment of water for irrigation of plants and for wateriung livestock, which were carried out in both Russia and China. The results shown indicated improvement in growth and quality of the agricultural products, but as far as we know, these tests were not continued, probably due to the lack of suitable equipment; in any case, no commercial equipment has been brought onto the market in either country. This information induced us to make experiments with magnetically treated water for irrigation of plants and for watering cattle and other livestock, whilst using the hitherto known devices for treating the water flowing therethrough. It soon became evident that the existing devices were not adequate and suitable for these purposes for the following reasons: the devices were soon clogged by scale or by impurities in the water; the water was not always suitably treated owing to incorrect flow conditions; after a few hours the water returned to its original state which did not permit its storage in overhead tanks—as used in poultry growing—, or its standstill in pipes—as with in cattle watering stations—; not all water was suitable for magnetic treatment, especially near-pure water; water temperature became too high, especially recirculated water, and the treatment did not give the desired results.

After years of in-vivo experimentation we found that there are relevant and critical conditions regarding the nature of the water to be treated, hydraulic flow conditions, magnetic flux, magnetic field intensity and direction, which have to be fulfilled in order to obtain improved and accelerated growth of plants and animals. During experimentation we improved the water treatment and found that, in addition to faster growing, the quality of both plant and animal was raised owing to the so-treated water given to them. While growing poultry, cattle, sheep and swine, results showed increased milk yield, better utilization of fodder, increased proportion of meat to fat and other improvements. Poultry showed increased egg production as well as the aforementioned results. Plants irrigated with treated water showed, in addition to faster growth, larger, healthier and greener leaves and larger and sweeter fruit. It was also noticed that the plants required less fertilizer and that the growing season could be lengthened.

In order to attain these results we found that apparatus for magnetic treatment as well as the water flow conditions should fulfill the following conditions: (1) laminar or nearly laminar flow; (2) vertical upwards flow through the device; (3) magnetic flux density to be between 950 and 3200 gauss (4) the alternating multipole magnets to contain between 4 and 8 poles; (5) magnetic field vector to be substantially perpendicular to water flow vector; (6) spacing and numbers of poles to be determined so as to obtain a predetermined frequency of polarity acting on the water molecules at a predetermined flow velocity; (7) means to be provided to keep the device clean and free of scale and dirt accumulation; (8) both the cover of non-magnetic material as well as the tubular casing of magnetic material to be protected against corrosion and pitting by chemical action or by magneto-hydrodynamically generated voltage; (9) temperature of the water flowing through the device to be below 80° C.

SUMMARY OF THE INVENTION

In accordance with the present invention magnetic treatment of water for irrigation of plants and for watering of domestic animals is carried out by causing raw water to flow through a device which comprises at least one magnetic unit whereof each unit includes:

an elongated, alternating multi-pole magnet mounted inside the device in substantially vertical alignment, the magnet comprising between 4 and 8 axially spaced poles, an inner casing of a non-magnetic material encasing and protecting the multi-pole magnet, an outer casing of a magnetic material of a cross section larger than the cross section of the inner casing and surrounding the inner casing and the magnet in co-axial alignment, forming an annular water duct therebetween which communicates at its bottom end with the water inlet and at its top end with the water outlet, hydrodynamic means for straightening the water flow at the entrance to the annular duct, to create a substantially laminar flow along the magnet, means for mechanic filtration of the water before its entrance into the magnetic unit with the object of removing ferromagnetic particles and other suspended matter, and means for backflushing and cleaning the device.

In a preferred embodiment a streamlined end cover is attached to the inner casing at its bottom end and/or its top end, to cause laminar flow along the annular duct.

With the object of cleaning the device from time to time, it is incorporated in a circuit which includes a bypass around the device and the necessary valves for directing the water flow in opposite direction, i.e. from top to bottom and into the open through a spillway.

In all cases where water is to be treated as drinking water for poultry, cattle and other livestock by either storing it in overhead tanks or circulating it through pipelines provided with a plurality of drinking troughs, it becomes necessary to recirculate the once-treated water through the device, since it looses its special properties after a few hours. The watering circuits for this kind of treatment include circulating pumps and filtering devices, as well as means for backflushing, and it becomes imperative that the pumps be designed for the correct flow rate through the magnetic unit, as otherwise the water will not be treated correctly.

Backflushing may be carried out manually or automatically by means of a timer adjusted to operate several solenoid valves at certain hours of the day or, alternatively, after a given throughflow of raw water through the device.

With a view to protecting the inner and the outer casing against corrosion and pitting by magneto-hydrodynamically created corrosion or by chemical action, their surfaces are protected by a layer of anticorrosive material.

In all cases where the water flow is too large for one magnetic unit, two or more units may be advantageously placed in parallel alignment, whereby the two or more units are incorporated in a circuit which is provided with backflushing devices as well as a recirculating pump, if the water is to be used as drinking water for domestic animals.

Since cool drinking water is beneficial to most animals and usually results in better yield, and since magnetic treatment is likewise improved at lower temperatures, it is proposed to use recirculation of treated water for its cooling. A preferred embodiment consists in a storage tank containing a splash plate mounted above water level onto which the water returning from the magnetic unit is directed, whereby the increased surface causes strong evaporation and thereby lowering of the water temperature.

DETAILED DESCRIPTION OF THE DRAWINGS

Figure 1:
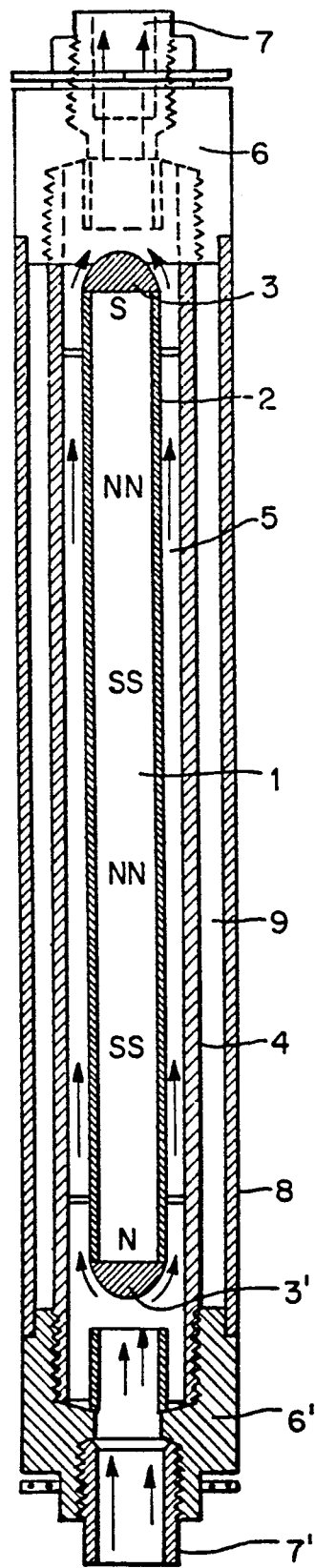
FIG. 1 is a longitudinal section through a magnetic treatment unit of the invention.

The magnetic treatment unit shown in FIG. 1 comprises an elongated permanent magnet 1 provided with six poles marked by "N" and "S", which is generally manufactured of a aluminum-nickel-cobalt alloy (ALNICO). The magnet is covered by an inner casing 2 of copper or another non-magnetic material which protects the magnet against attack by the water flowing through the unit. Two stream-lined covers 3 and 3' are attached to the ends of magnet 1 and casing 2 ensuring formation of a laminar flow through the unit, provided the flow velocity is kept within the proper limits, i.e. below the critical Reynolds Number. An outer, tubular casing 4 of a magnetic material, such a steel, surrounds the magnet and the inner casing in concentric alignment forming an annular water duct 5 between the two casings. The outer casing is fastened in two end fitting 6 and 6' by means of screw thread, these fittings serving for connecting the unit to an inlet and outlet pipe 7 respectively. An outer shell 8 of copper or another non-magnetic material connects the two end fittings and protects the entire unit against mechanical damage, while being spaced apart from the outer magnetic casing 4 and forming an air space 9 there-between.

The unit is placed in vertical—or substantially vertical—alignment, with a view to ensure complete filling of the annular duct with water to be treated. In a known manner the magnetic outer casing forms the outer limit for the magnetic field formed by the magnet poles which create a magnetic field of well-defined intensity, direction and distribution throughout the entire annular duct. Water enters the unit from below through the water inlet pipe 7' and leaves it in treated condition at the top end through the outlet pipe 7.

Figure 2:
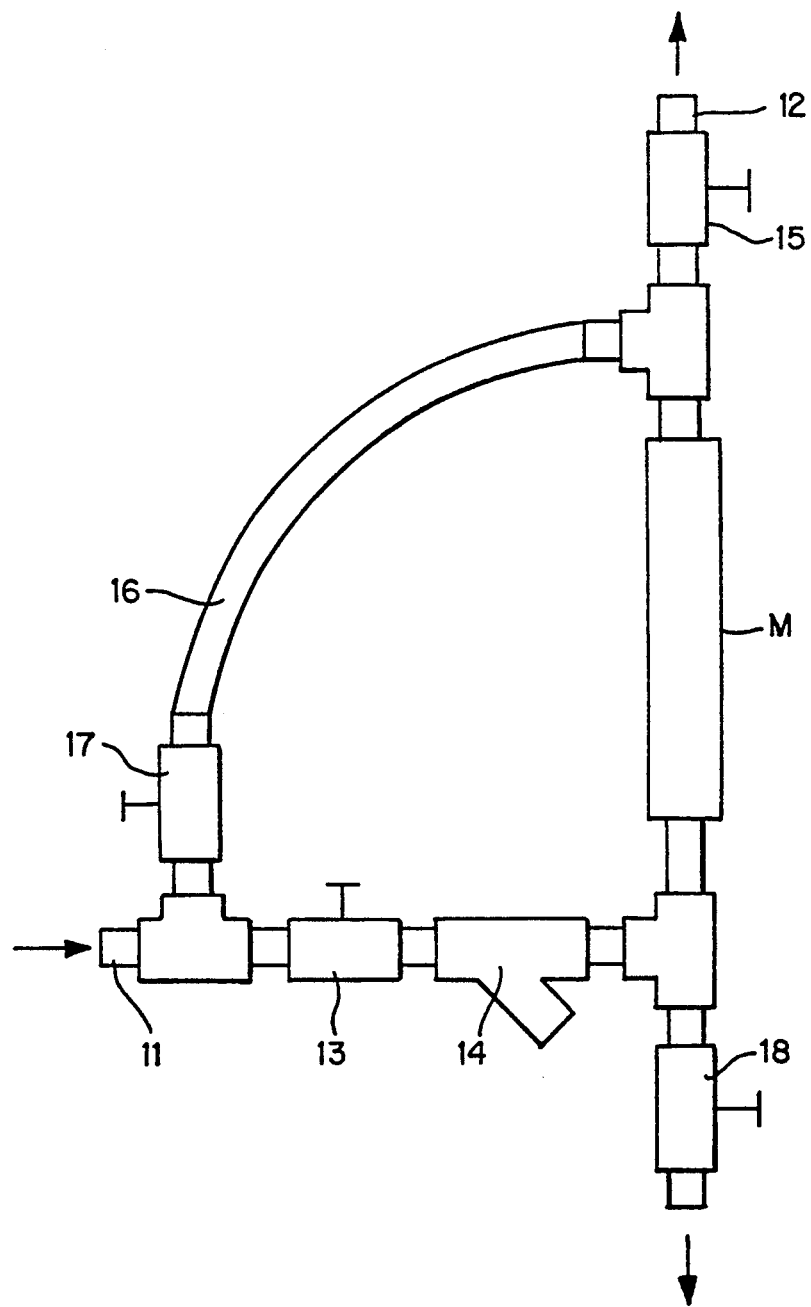
FIG. 2 is a side view of a circuit including the magnetic treatment unit of FIG. 1 suitable for field irrigation and provided with backflushing means.

FIG. 2 illustrates a circuit for once-through magnetic treatment and for backflushing of a magnetic unit from time to time in order to prevent build-up of scale or dirt in the duct. The present embodiment of a circuit has a water inlet 11 and a water outlet 12 leading to piping for plant irrigation. The water flows through the magnetic unit M through a line containing a stop valve 13 and a filter 14 to the outlet 12 which can be closed by a stop valve 15 for flushing purposes. A bypass 16 connects the inlet 11 direct with the outlet 12 and is, in its turn, closed by a valve 17. The bottom end of the magnetic unit communicates with a flush-water outlet through a valve 18. During normal irrigation the valves 13 and 15 are open, whilst the valves 17 and 18 are closed, forcing all irrigation water through the magnetic unit. For back-flushing the valves 13 and 15 are closed and valves 17 and 18 are opened, thereby changing the direction of the water flow, forcing it through the magnetic unit from top to bottom and flushing out dirt and scale. The hand-operated valves shown in the drawing may be replaced by electrically operated valves, such as solenoid valves, to be actuated automatically, either after a certain period of irrigation or dependent on the measured throughflow.

Figure 3:
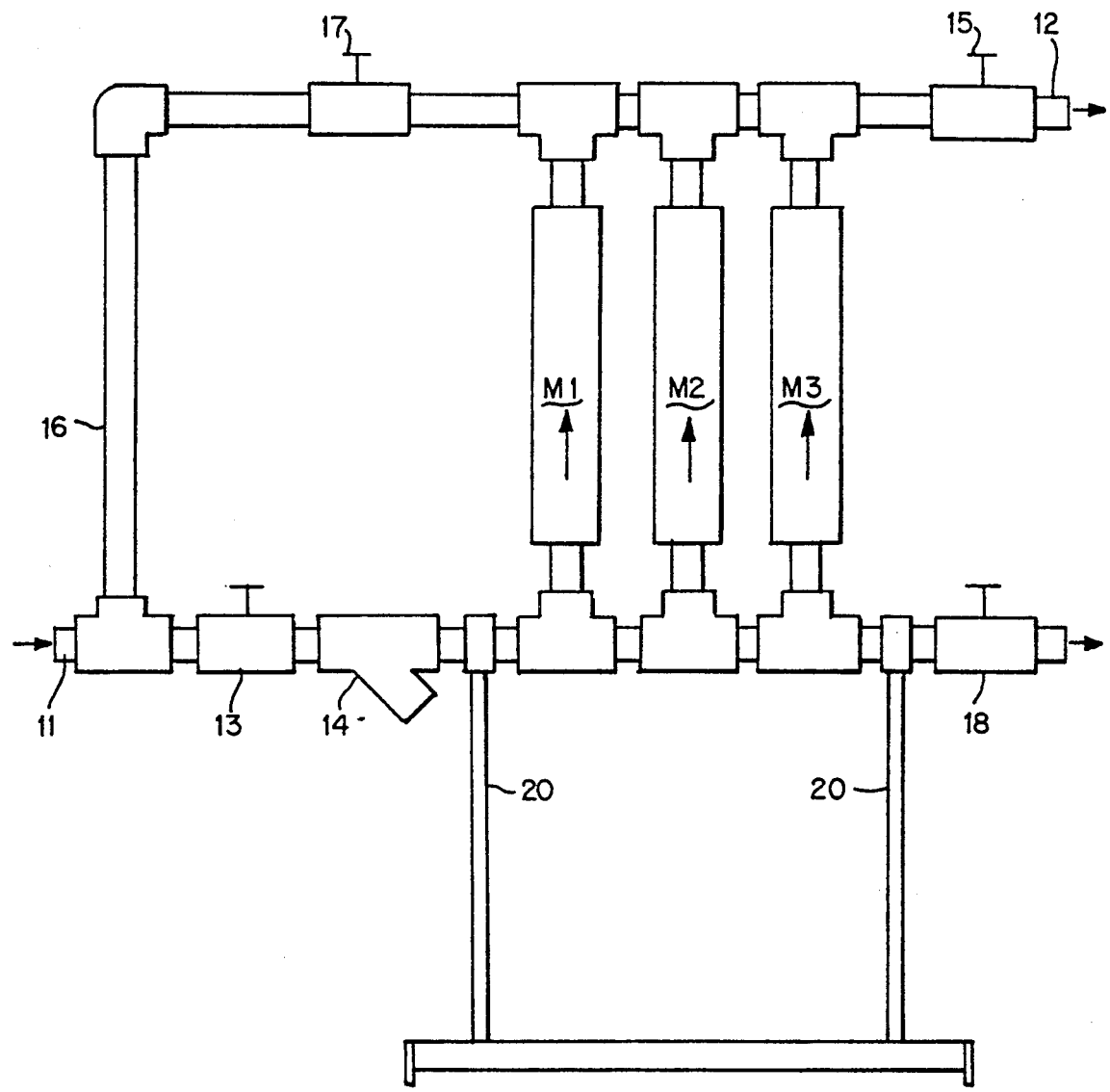
FIG. 3 is a side view of a circuit including three parallel magnetic treatment units provided with backflushing means and with a stand.

FIG. 3 illustrates a circuit similar to that shown in FIG. 2, however containing three magnetic units M1, M2 and M3 placed in vertical, parallel alignment. It is important that the distance between each two units is at least three times the magnet diameter, in order to prevent interference of the three magnetic fields. The piping and the arrangement of the valves is identical in both FIGS. 2 and 3, and for this reason the valves and lines are being denoted by the same numerals. The entire circuit is held and supported on a stand 20 which keeps the magnetic units in vertical position and permits its ready transfer from site to site.

Figure 4:
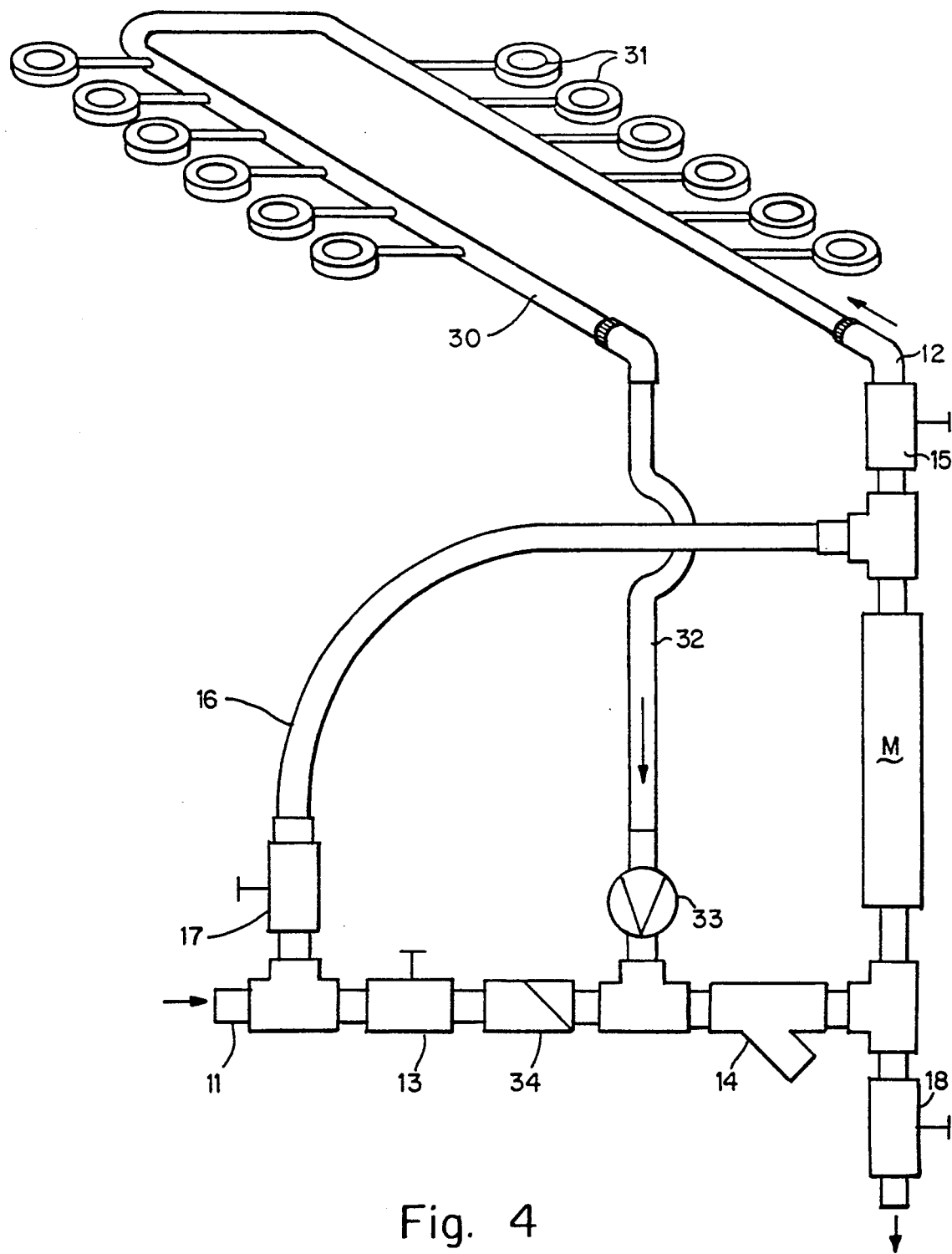
FIG. 4 illustrates a circuit adapted for recirculation of drinking water for ruminants, showing a row of drinking troughs.

Magnetic treatment of drinking water for cattle is illustrated in FIG. 4, showing a feed pipe 30 with a plurality of drinking troughs 31 attached thereto by means of automatic taps. The magnetic unit M is placed in a circuit which is adapted for recirculation of the drinking water flowing through the feed pipe 30 and through the magnetic unit; it is adapted for backflushing similarly as illustrated in FIGS. 2 and 3, and for this reason identical numerals are used for denoting identical or similar components. The recirculating circuit includes, additionally, a return pipe 32 extending from the tail end of the feed pipe 30, a circulating pump 33 and a check valve 34. Water returning from the feed pipe is pumped through the filter 14 and the unit M back into the feed pipe, while the check valve 34 prevents water from being pumped back into the supply pipe 11. The check valve opens as soon as the pump pressure drops due to an insufficient quantity of water returned from the feed pipe and causes fresh water to flow in from the supply. Back-flushing is carried out as described with reference to FIGS. 2 or 3.

Figure 5:
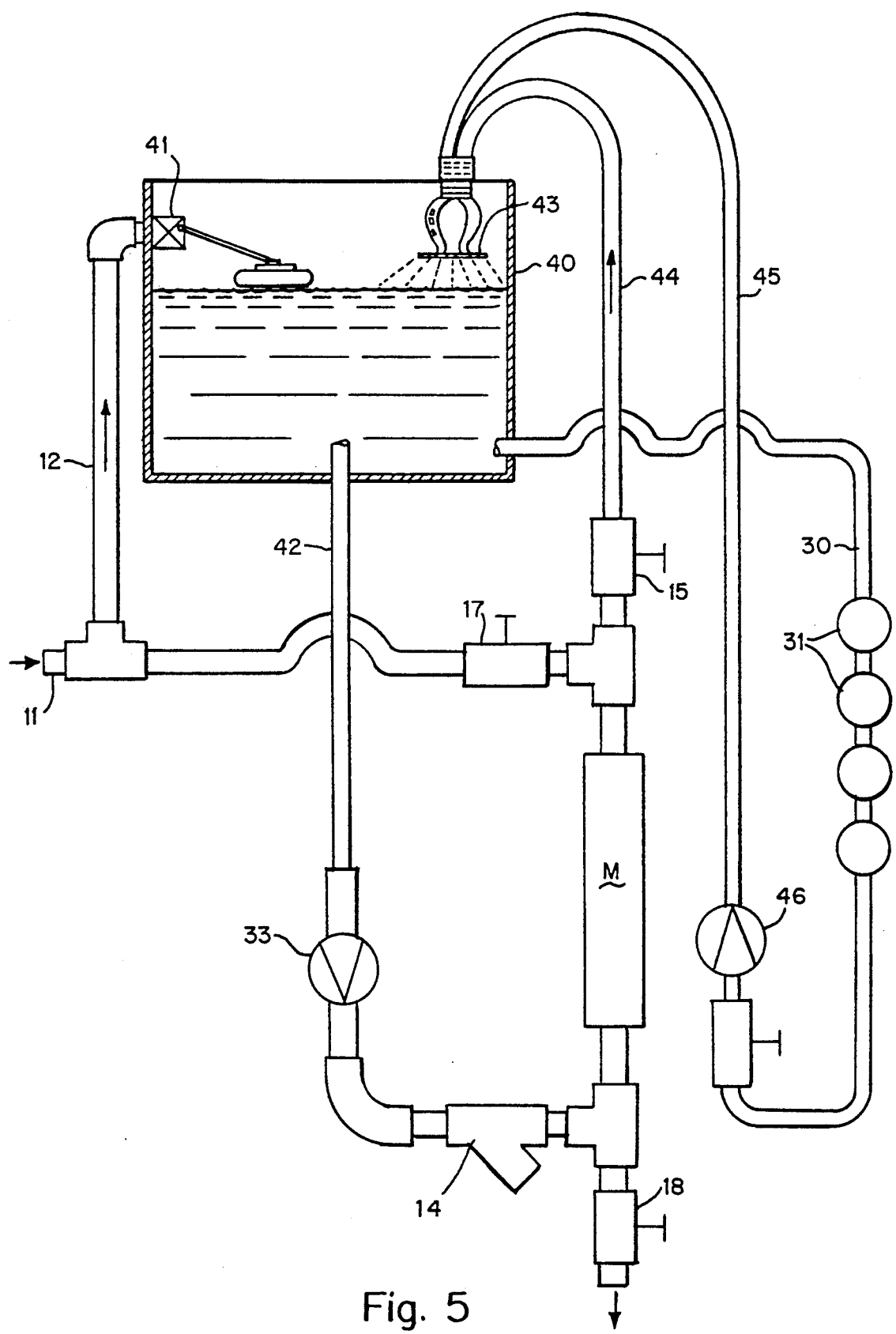
FIG. 5 illustrates a circuit adapted for recirculation of water from an overhead reservoir, as used for watering of poultry.

The magnetic treatment circuit shown in FIG. 5 is used in preparing drinking water for poultry. In hencoops the drinking troughs are usually fed from a central overhead tank or container, preventing water shortage in case of a breakdown of the water supply, and the apparatus shown in FIG. 5 is designed for re-treatment of the water in the tank which would, otherwise, loose its special properties after a few hours, as mentioned in the foregoing. The drawing shows an overhead tank 40 supplied raw water from a central supply 11 through a pipe 12 which terminates in a float valve 41 in order to prevent overflowing. Water is pumped out of the tank by a pump 33 through an outlet pipe 42 and conveyed to the magnetic unit M after having ferromagnetic particles and other suspended matter removed by a filter 14. The pump is designed to an output to ensure water velocity and magnetization of water at the predetermined frequency as described in the foregoing. The treated water flows into the tank through piping 44 and an overhead outlet from which it drops down onto a splash plate 43. The water leaves the splash plate in the form of a fine spray and flows down into the tank while being cooled by evaporation. Water to the drinking troughs 31 leaves the tank through an outlet pipe 30, while a pump 46 serves for returning the non-consumed water to the overhead tank via piping 45 and over the splash plate 43 for further cooling and for recirculation through the magnetic unit M. Back-flushing is made as in the previously described embodiments by means of valves to be opened and closed, which are not specifically described here, since they correspond to the valves shown and described with reference to the aforedescribed embodiments and wherein identical components are denoted by identical numerals.

It is reiterated that good results were obtained only whenever the water flow through the magnetic unit was laminar and whenever the units were positioned in vertical alignment so as to ensure complete filling of the annular space. It was also found that magnets should have between 4 to 8 poles, and that the magnetic field intensity should vary between 600 and 6500 gauss, with a magnetic field gradient of 0.2-6.0 mgauss/cm. These values dictate the dimensions of the magnets and the casings, and tests have shown that optimal values could be obtained with magnets of aluminum-nickel-cobalt alloys and of rare earth elements as known to the art. Magnets made from RER's are useful because they retain their high magnetic intensity. In addition to the above kinds of magnets it is also proposed to use electromagnets of similar strength and polarity, but it is pointed out that with permanent magnets no external energy is required, except for operation of the water pumps, and that the described apparatus have an extremely long life, provided they are kept clean and protected against corrosion.

The flow velocity of the water in the annular duct should be between 0.5 and 2.4 m/s, so as to obtain substantially laminar flow in the annular duct, which also requires the fitting of streamlined caps to the ends of the magnet, which are, preferably but not necessarily, of parabolic cross section. Best results were obtained by chosing the flow velocity in a manner that each molecule passes each pair of alternating magnet poles between 2 to 60 times per second, i.e. at a frequency of 2-60 Hz. The flow velocity is therefore dependent on the number and spacing of the poles, as well as on the condition of laminar flow.

Another important point for obtaining good results is to keep the water temperature below ambient temperature on hot days and in the hot season, which can be carried out by evaporation of a part of the water, either by means of separate cooling equipment or, in the case of an overhead tank, by splashing the incoming water on a flat plate, as described with reference to FIG. 5. The water must have a minimum electric conductivity, but should be free of electromagnetic particles which have to be removed by mechanical filtering. Treatment results improve with increased conductivity, whereby tap water has usually low conductivity, while treated sewage and brackish water answer far better.

As described in the foregoing it is important to cover the surfaces bordering the annular duct with an anticorrosive layer, as protection against corrosion.

Although the full nature of the action of magnetically treated water is not yet fully understood, it is assumed that it cleans the alimentary ducts and membranes both in livestock and plants, improves metabolic processes and activates mass transfer of molecules and electrolyte ions through living membranes in both directions, which may be the cause of better digestion of fodder and subsequent increased growth and yield. For this reason treated water may likewise be used in aquaculture or even as drinking water for human beings.

Tests with irrigation of plants have shown that magnetic treatment can be carried out before or after addition of liquid fertilizers; however, better results obtained with treatment before its addition.

We claim:

1. A method of magnetically treating water for watering of livestock, comprising the steps of:
    (a) mechanically cleaning the water so as to remove ferromagnetic particles and other suspended matter therefrom;
    (b) causing the water to pass through a magnetic field of alternating polarity wherein
        said magnetic field is of an intensity of between 600 and 6500 gauss, and has a field gradient of between 0.2 and 6.0 kgauss/cm;
        said water passing through said magnetic field flows in a direction which is substantially perpendicular to the magnetic field vector of said magnetic field;
        said water flow through said magnetic field is substantially laminar, at a velocity of between 0.5 and 2.4 m/s; and
        said laminar water flow is at a velocity for causing each water molecule of said laminar water flow to pass through said magnetic field of alternating polarity at a frequency of not less than 2 and not more than 60 polarity changes per second; and (c) recirculating water not consumed by said livestock by pumping the unconsumed water through said magnetic field at said velocity of between 0.5 and 2.4 m/s, to be magnetically retreated.

2. The method of magnetically treating drinking water for watering of livestock as claimed in claim 1, further comprising storing the treated water in an overhead reservoir and pumping a portion of the water in said reservoir back through said magnetic field, wherein the pumping effects a water flow of a velocity suitable for effecting a change of polarity on each water molecule at a frequency of between 2 and 60 Hz.

3. The method of magnetically treating water for watering of livestock as claimed in claim 1, comprising passing treated water to drinking troughs; and wherein said recirculating step includes recirculating water not consumed by livestock through a closed water circuit.

4. The method of magnetically treating water for watering of livestock as claimed in claim 1, comprising storing treated water in a storage tank; and cooling treated water returned to said tank by evaporation while causing it to be divided into a fine spray.

* * * * *